United States Patent
Ono et al.

[11] Patent Number: 6,123,430
[45] Date of Patent: *Sep. 26, 2000

[54] SURFACE LIGHT SOURCE DEVICE OF SIDE LIGHT TYPE

[75] Inventors: Toshiaki Ono, Akishima; Shingo Ohkawa, Koshigaya; Manabu Takashio, Kawaguchi, all of Japan

[73] Assignee: Enplas Corporation, Kawaguchi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/940,374

[22] Filed: Sep. 30, 1997

[30] Foreign Application Priority Data

Oct. 4, 1996 [JP] Japan .................................. 8-283060

[51] Int. Cl.[7] ........................................................ F21V 7/04
[52] U.S. Cl. .............................................. 362/31; 362/26
[58] Field of Search ........................ 362/26, 31; 349/65, 349/67

[56] References Cited

U.S. PATENT DOCUMENTS 5,709,447  1/1998  Murakami et al. ........................ 362/31
5,735,590  4/1998  Kashima et al. ........................... 362/31
5,810,464  9/1998  Ishikawa et al. .......................... 362/31

*Primary Examiner*—Nimeshkumar D. Patel
*Assistant Examiner*—Todd Reed Hopper
*Attorney, Agent, or Firm*—Staas & Halsey LLP

[57] ABSTRACT

Local irregularities in luminance are removed from a surface light source device of side light type 20 applied to a liquid crystal display or the like. In assembly, a reflection sheet 4 and a primary light source 23 are mounted on a light guide plate 2, and these components are housed at a predetermined position in a frame 21. The primary light source 23 has a fluorescent lamp 25 and a reflector 26, and supplied illumination light to an end surface (an incidence surface) 2A of the light guide plate 2. The reflector 26 presses the reflection sheet 4 against the light guide plate 2 and supports the reflection sheet. A support member 24 has a claw 24C engageable with a claw 21C of the frame 21. A light absorbable layer 27 is formed on an end portion of the reflection sheet 4. Since the reflection sheet 4 projects toward the primary light source and is pressed against the light guide plate 2 by the reflector 26, there is less quantity of light actually incident onto a lower edge ED, even if the illumination light makes a propagation toward the edge ED. Thus, it is possible to prevent the phenomenon that the edge ED on the side of the reflection sheet 4 is brightly illuminated with illumination light from occurring in the vicinity of the end surface (the incidence surface) 2A of the light guide plate 2 to which the light is supplied.

3 Claims, 6 Drawing Sheets

SURFACE LIGHT SOURCE DEVICE OF SIDE LIGHT TYPE

BACKGROUND

1. Field of Invention

This invention relates to a surface light source device of side light type, and more particularly, to a surface light source device of side light type, which shows improved uniformity in luminance. The present invention is applied to backlighting in a liquid crystal display, for instance.

2. Related Art

It is a matter of common knowledge that a surface light source device of side light type provides a thin backlighting arrangement to illuminate a liquid crystal display panel. In general, the surface light source device of side light type has a light guide plate made of a plate-like light guiding member and a primary light source including a long cylindrical light source, and the primary light source is arranged on the lateral side of the light guide plate.

Illumination light emitted from the primary light source is introduced into the light guide plate through an end surface of the light guide plate. The introduced illumination light is refracted and then emitted toward a liquid crystal display panel through one of the major surfaces of the light guide plate. Since the primary light source is arranged on the lateral side of the light guide plate, it is possible to easily provide a device of thin type on the whole.

A well-known light guide plate employed in the surface light source device of side light type as described above is classified into a light guide plate of a type which is substantially uniform in thickness, and a light guide plate of a type which shows a tendency to decrease a thickness according as the light guide plate becomes more distant from the primary light source. Generally, the light guide plate of the latter type emits illumination light more efficiently than that of the former type.

FIG. 5 is an exploded perspective view showing a surface light source device of side light type employing the light guide plate of the latter type. FIG. 6 is a sectional view taken along a line A—A in FIG. 5. Referring to FIGS. 5 and 6, a surface light source device of side light type 1 has a light guide plate 2, and a primary light source 3 is disposed on the lateral side of the light guide plate. The surface light source device 1 further has a reflection sheet 4, a diffusible sheet 5, prism sheets 6, 7 function as a light control member, and a protective sheet 8 of low diffusibility, and these components are laminatedly arranged together with the light guide plate 2 as shown in FIG. 6.

The primary light source 3 has a cold cathode tube (a fluorescent lamp) 9 and a reflector 10 surrounding the cold cathode tube. The reflector 10 has an aperture, through which illumination light is supplied to an end surface 2A of the light guide plate 2. The reflector 10 is made of a regular reflective or diffuse reflective sheet material or the like. The light guide plate 2 having a wedge-shaped section is made of an acrylic material (PMMA resin), for instance, by means of injection molding. The light guide plate 2 receives the illumination light from the primary light source 3 through one end surface defined as an incidence surface 2A.

In the light guide plate 2, the illumination light makes a propagation while undergoing repetitive reflection between a major surface (which will be hereinafter referred to as "a slope") 2B, along which the reflection sheet 4 is disposed, and a different major surface (which will be hereinafter referred to as "an emitting surface") 2C, along which the diffusible sheet 5 is disposed.

Every time reflection occurs, a component of light incident at an angle of not more than a critical angle is emitted through the slope 2B and the emitting surface 2C. Accordingly, the illumination light emitted through the emitting surface 2C is inclined to mainly make a propagation toward the wedge end. This phenomenon is called emitting directivity.

Further, a diffusible surface 2D is formed on the slope 2B. The diffusible surface 2D is provided with diffusibility which steps up from the side of the incidence surface 2A toward the wedge end. The diffusibility is provided by means of coating the slope with diffusible ink containing a pigment consisting of magnesium carbonate, titanium oxide or the like, for instance. The degree of diffusibility may be adjusted according to a quantity of diffusible ink coated on the slope.

The slope 2B may also be provided with diffusibility by means of matting (roughening) the slope 2B, instead of coating the slope with the diffusible ink. In this case as well, such diffusibility as sets up from the side of the incidence surface 2A toward the wedge end is provided. Thus, matted surface areas of a rectangular shape, for instance, are formed in a distributed state at a certain or random pitch such that the density of distributed areas sets up from the side of the incidence surface 2A toward the wedge end.

The light guide plate 2 as described above corrects a quantity of output light decreased in the vicinity of the wedge end, and makes the distribution in quantity of output light uniform. It is to be noted that such diffusibility is not so intensive as the light guide plate is allowed to lose the emitting directivity. That is, even if the diffusibility is provided to the slope 2B, the illumination light emitted through the emitting surface 2C is inclined to mainly make a propagation toward the wedge end.

The reflection sheet 4 is made of a sheet-like regular reflective member consisting of metal foil or the like or a sheet-like diffuse reflective member consisting of a white PET film or the like. Illumination light leaking out of the slope 2B is incident again onto the light guide plate 2 after having been reflected by the reflection sheet 4, resulting in improvement of efficiency of illumination light utilization.

The prism sheets 6, 7 are arranged to correct the emitting directivity of the light guide plate 2. The diffusible sheet 5 is arranged to prevent the diffusible surface 2D on the slope 2B from being visibly observed from above the emitting surface 2C, and also to make highlight and shadow or the like in each part of the light guide plate 2 illuminated with the illumination light less noticeable.

The diffusible sheet 5 diffuses the illumination light emitted through the light guide plate 2. The prism sheets 6, 7 are made of a light-transmitting sheet material such as polycarbonate. In each prism sheet, a surface (an outside surface) with its back to the light guide plate 2 is formed as a prism surface. The prism surface is composed of a large number of projections which are respectively triangular in sectional shape and run approximately parallel in one direction. In the shown case, the projections on the inside prism sheet 6 are oriented so as to run parallel to the incidence surface 2A, while the projections on the prism sheet 7 are oriented so as to run in a direction orthogonal to the incidence surface 2A.

The prism sheets 6, 7 correct a main emitting direction of output light with a slope of each projection so as to emit the output light in a frontal direction of the emitting surface 2C. It may be also possible to use a so-called double-faced prism sheet having both surfaces respectively serving as prism surfaces.

In general, the surface light source device of side light type employing the wedge-shaped light guide plate and the prism sheets as described above may emit the output light in the frontal direction more efficiently than a surface light source device of side light type employing a light guide plate which is substantially uniform in thickness.

The protection sheet 8 protects the surface of the prism sheet 7 from damage or the like, and relieves the directivity of output light corrected by the prism sheets 6, 7 so as to enlarge an angle of visual field. Accordingly, the illumination light may be emitted to a desired extent in the frontal direction of the emitting surface.

FIG. 7 shows a surface light source device of side light type in another prior art. The surface light source device shown in FIG. 7 has a structure similar to that in the surface light source device shown in FIGS. 5 and 6, except that a reflection sheet 4 in the surface light source device shown in FIG. 7 extends to the vicinity of the incidence surface 2A of the light guide plate.

OBJECT AND SUMMARY OF INVENTION

In the above well-known surface light source device of side light type 1, edges EU, ED on the side of the incidence surface are brightly illuminated with illumination light, and these brightly-illuminated edges EU, ED are observed through the emitting surface. In this case, build-up of a luminance level occurs linearly in the emitting surface, and emission lines K parallel to the incidence surface are caused on the emitting surface. Irregularities in luminance caused by the emission lines remarkably lower the grade of output light.

An object of the present invention is to provide a technique for avoiding irregularities in luminance caused by the above factor. According to the present invention, it is possible to prevent edges in the vicinity of an incidence surface of a light guide plate from being brightened enough to be observed from above the emitting surface. As a result, it is possible to effectively avoid the irregularities in luminance, and also to provide illumination light of high grade.

The present invention is applied to a surface light source device of side light type comprising a light guide plate having an incidence surface, an emitting surface and a surface opposite to the emitting surface, and a primary light source to supply light to the incidence surface.

According to the features of the present invention, a reflection sheet is disposed along the surface opposite to the emitting surface of the light guide plate such that the reflection sheet projects from the incidence surface toward the primary light source. It is preferable that the reflection sheet is pressed against the light guide plate on the side of the incidence surface. It is also preferable that a light absorbable layer is formed on an end portion of the reflection sheet on the side of the primary light source.

The reflection sheet returns illumination light, which leaks out of the light guide plate, to the light guide plate, while the reflection sheet decreases a quantity of illumination light incident onto the edges and prevents the edges from being brightly illuminated, since the reflection sheet is disposed so as to project from the incidence surface. As a result, it is possible to avoid such irregularities in luminance as the bright edges are observed from above the emitting surface. If the reflection sheet is pressed against the light guide plate on the side of the incidence surface, it is advantageous to the reflection sheet for decreasing the quantity of illumination light incident onto the edges without fail. Further, the structure of the reflection sheet having the light absorbable layer formed on the end portion on the side of the primary light source facilitates a solution of the problem of the irregularities in luminance.

Hereinafter, the present invention will be described more specifically with reference to the accompanying drawings.

PREFERRED EMBODIMENTS (1) First Embodiment

Figure 1:
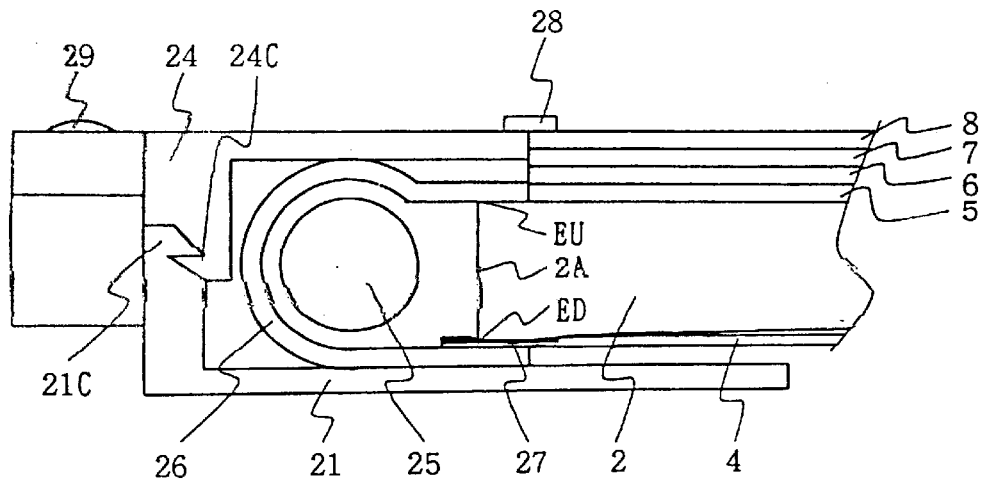
FIG. 1 is a sectional view showing a surface light source device of side light type according to the first embodiment of the present invention.
Figure 2:
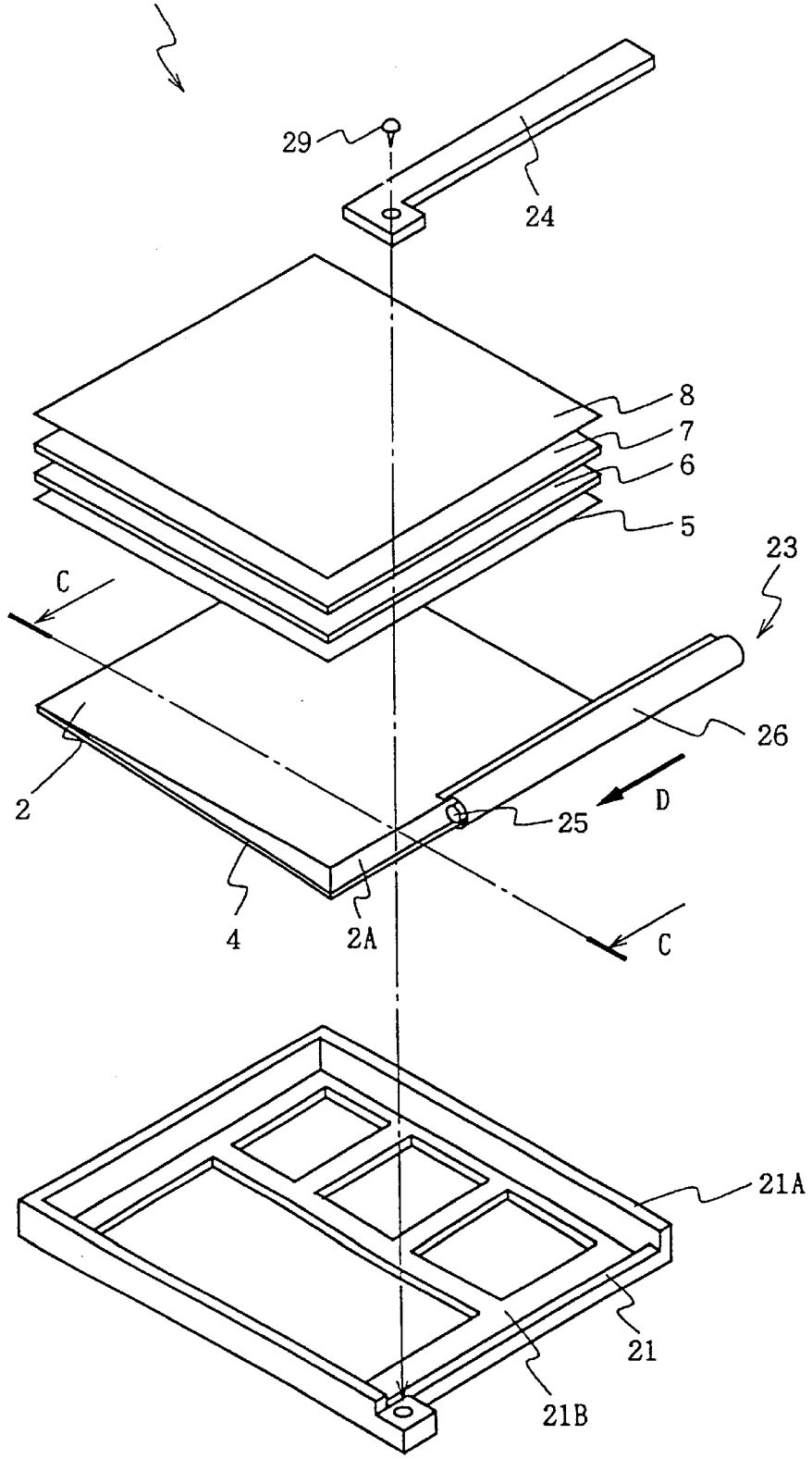
FIG. 2 is an exploded perspective view showing the overall structure of the surface light source device of side light type shown in FIG. 1.
Figure 5:
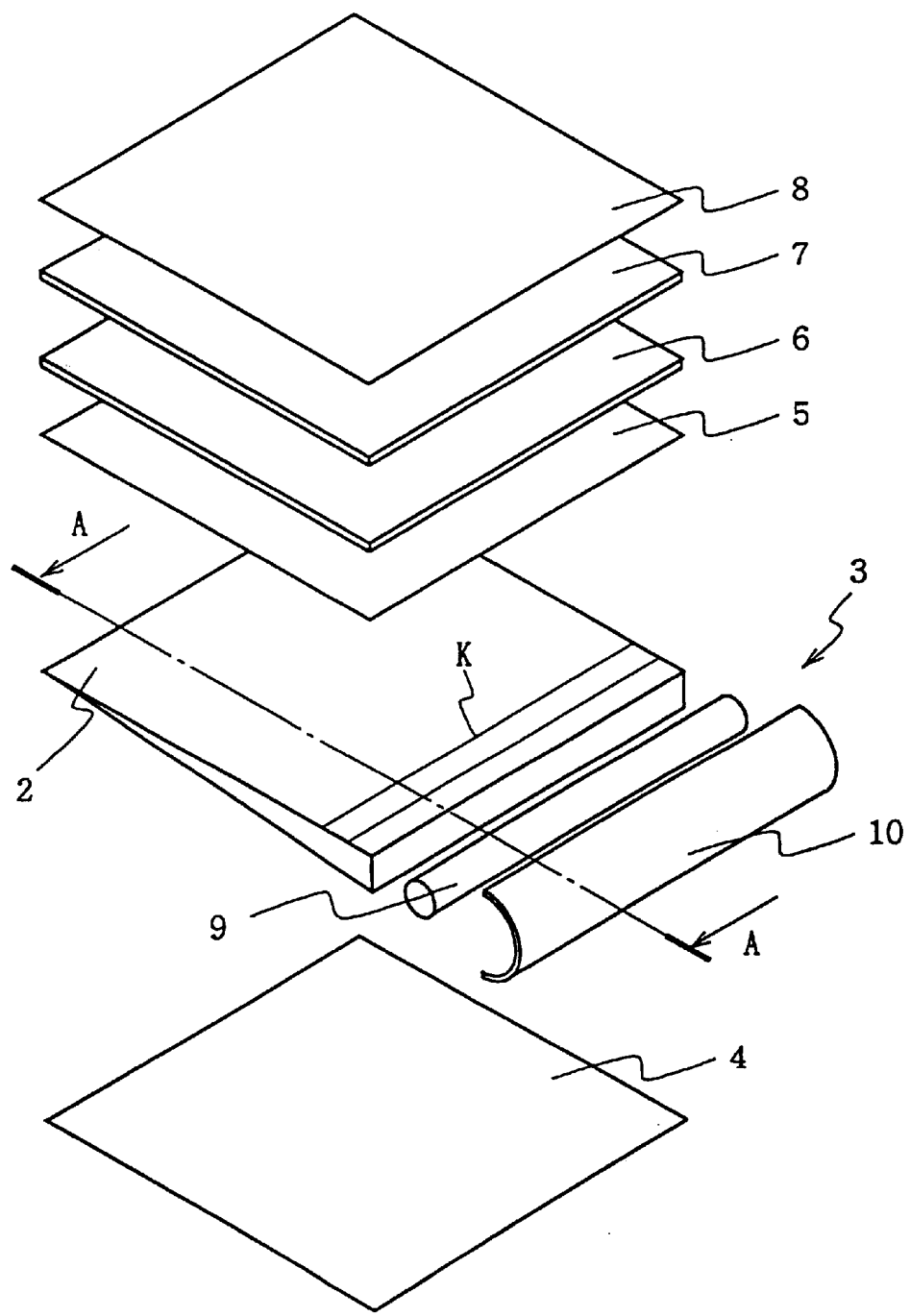
FIG. 5 is an exploded perspective view showing a surface light source device of side light type in a prior art.
Figure 6:
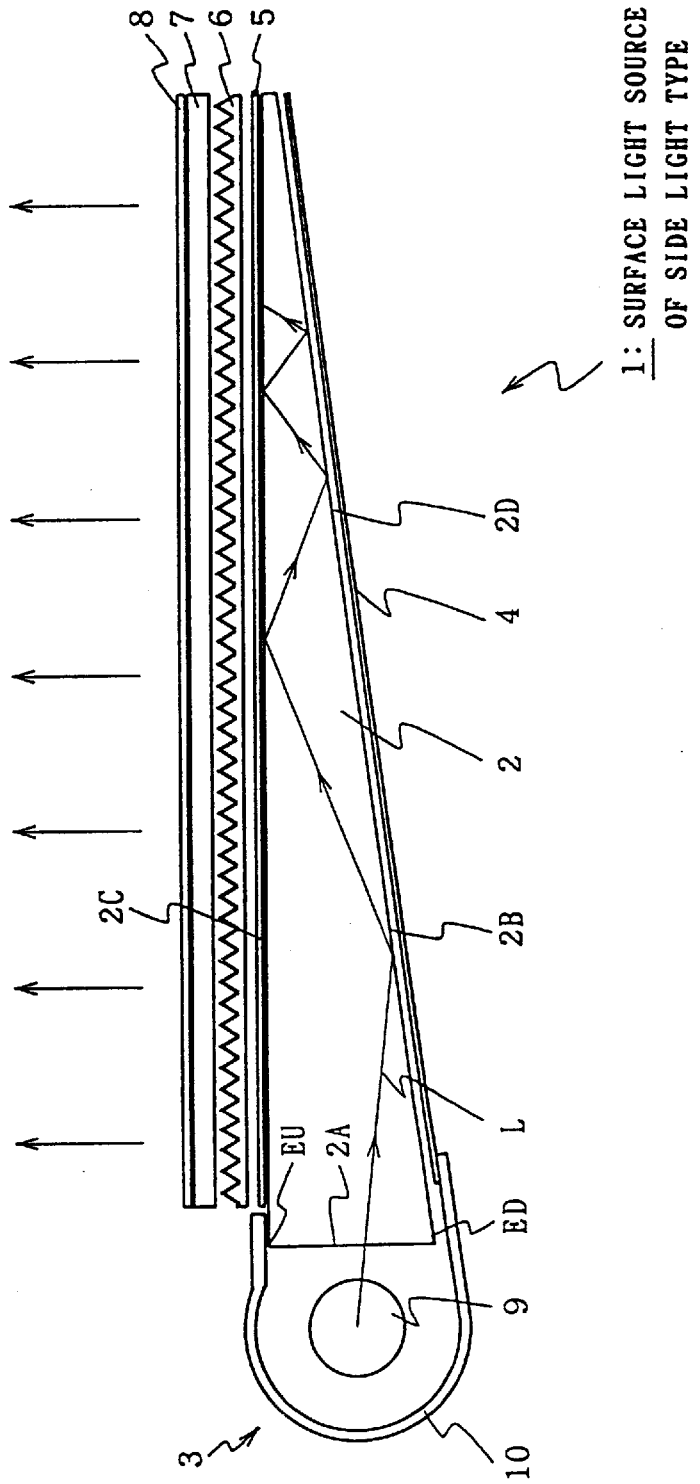
FIG. 6 is a sectional view taken along a line A—A in FIG. 5.
Figure 7:
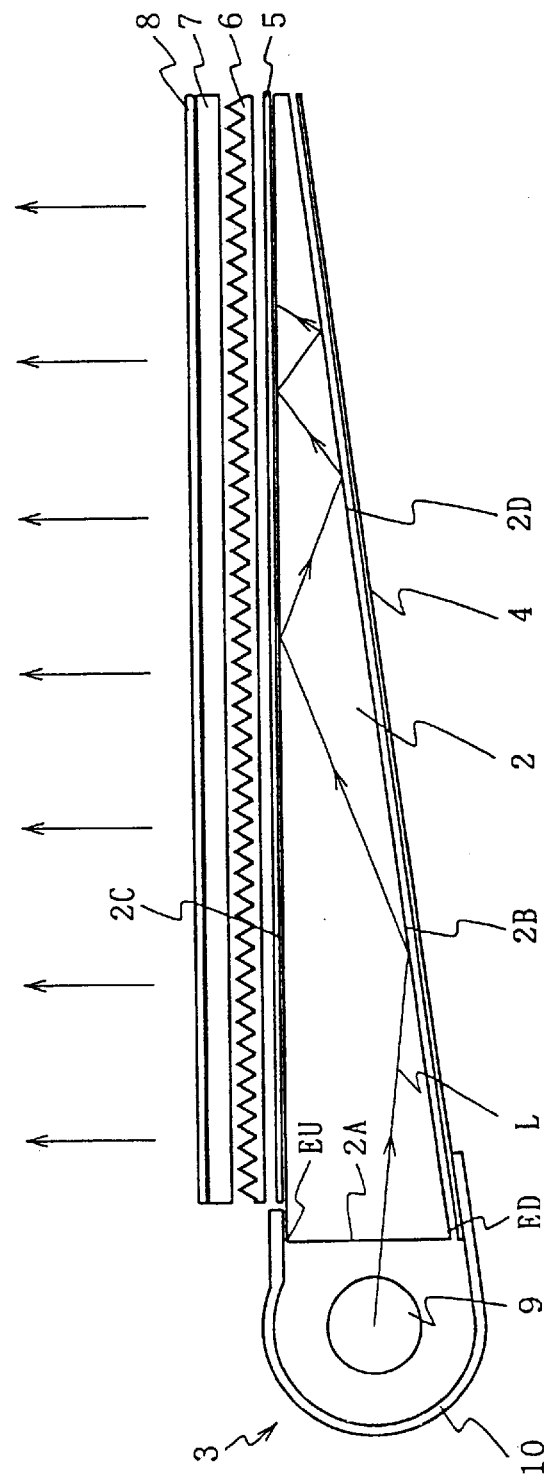
FIG. 7 is a sectional view showing a surface light source device of side light type in another prior art.

FIG. 2 shows a surface light source device of side light type according to the first embodiment in the form of a drawing similar to that shown in FIG. 5. FIG. 1 shows a section taken along a line C—C in FIG. 2. Components common to FIGS. 1, 2 and 5 are designated by the corresponding reference numerals, and descriptions thereof are omitted to avoid repetition.

Referring to FIGS. 1 and 2, a surface light source device of side light type 20 comprises a frame 21. This surface light source device is assembled by arranging a light guide plate 2 and other components in sequence on the frame 21. The frame 21 is made of a white resin of high reflectance, which efficiently reflects illumination light, by means of injection molding. The frame 21 is composed of thin plate-like side plates 21A to surround the lateral side of the surface light source device of side light type 20 and a bottom to close up the side plates 21A from the side of the slope of the light guide plate 2.

The bottom has a thin plate-like muntin 21B fringing the slope side of the light guide plate 2 and connected to the side plates 21A at an appropriate position. The muntin 21B of the frame 21 reduces deformation in molding. Further, frame 21 projects downward in the figure at an appropciate position of muntin 21B. A tapped hole is formed in the projected portion, and a drive substrate (not shown) of a liquid crystal display panel or the like is supported on the rear side by the use of this tapped hole, so that the structure of the frame secures sufficient strength, and holds the total weight down to less value.

Further, in the side plate 21A of the frame 21, a portion corresponding to the primary light source is formed to be narrower than the other portion. This narrow portion of the side plate 21A has a claw 21C at a certain interval. One end of the narrow portion of the side plate 21A projects outward in a rectangular form in section, and a tapped hole is formed in this projected portion.

In assembly, the reflection sheet 4 and a primary light source 23 are mounted on the light guide plate 2, and these components are housed at a predetermined position in the frame 21. Subsequently, a support member 24 is brought into engagement with the narrow portion of the side plate 21A and fastened thereto by screwing.

The primary light source 23 is composed of a long cylindrical fluorescent lamp 25 and a reflector 26 surrounding the fluorescent lamp 25. Illumination light is supplied to the end surface 2A of the light guide plate 2 through an aperture of the reflector 26. The reflector 26 is made of a brass sheet which is bent in such a form as to exert elastic force. In the reflector 26, silver is evaporated on the inside surface opposed to the fluorescent lamp 25, so that the illumination light emitted from the fluorescent lamp 25 is efficiently supplied to the light guide plate 2.

Further, in the reflector 26, after the reflector is bent toward the incidence surface 2A to once reduce the total width, an end portion of the reflector is allowed to project by a small distance to be in parallel with the emitting surface and the slope of the light guide plate 2. The aperture on the side of the end of the reflector is formed to have a width smaller than the thickness of the light guide plate 2 on the side of the incidence surface 2A.

In mounting of the reflector 26, the reflection sheet 4 and the light guide plate 2 are supported in a laminated form, and in this supported state, the aperture is held in the range of the periphery and the lateral side of the incidence surface of the light guide plate 2. Subsequently, the reflector 26 is allowed to slide along the incidence surface 2A of the light guide plate 2 as shown by an arrow D, and then mounted on the light guide plate 2. After mounting, the reflector 26 presses the reflection sheet 4 against the light guide plate 2 and supports the reflection sheet.

On the other hand, the support member 24 is made of the same resin as the frame 21 by means of injection molding. The support member 24 has a claw 24C corresponding to the claw 21C of the frame 21. After the light guide plate 2 has been housed in the frame 21, the support member 24 is pressed against the frame 21 from the side of the emitting surface. In this process, the claw 24C is brought into engagement with the claw 21C of the frame 21, and the support member 24 is supported by the frame 21. Further, the support member 24 has a through hole corresponding to the tapped hole in the frame 21, and is fixed to the frame 21 with a screw 29 which is passed through the through hole and the tapped hole, in such a state that the support member 24 is supported by the frame 21.

In the surface light source device of side light type 20, the reflection sheet 4, the light guide plate 2 and the primary light source 23 are supported by the frame 21 in this manner. The diffusible sheet 5, the prism sheets 6, 7 are laminatedly arranged on the emitting surface of the light guide plate 2, and a protection sheet 8 is arranged on the prism sheet 7.

The protection sheet 8 is fixed to the support member 24 with an adhesive tape 28. In the surface light source device of side light type 20 assembled in this manner, the end of the reflection sheet 4 on the side of the incidence surface 2A projects from the end of the incidence surface 2A toward the primary light source as shown in FIG. 1, and is pressed against the light guide plate 2 by the reflector 26 to support the end of the reflection sheet 4 by the reflector.

Further, an end portion of the reflection sheet 4 on the side of the primary light source is coated with light absorbable ink by means of printing to provide a light absorbable layer 27. The light absorbable layer 27 is composed of printed dots of a predetermined shape. A dot area is gradually made smaller such that a quantity of light absorption per unit area is gradually decreased according as the dot area becomes more distant from the end of the reflection sheet. Thus, the light absorbable layer 27 decreases a quantity of output light locally intensified on the side of the incidence surface 2A, and makes the luminance level in output light uniform.

This light absorbable layer 27 may be omitted. It is also possible to produce sufficient results even by using a reflection sheet 4 having no light absorbable layer 27. However, when it is necessary to make the luminance level in output light more uniform, it is preferable that the light absorbable layer 27 is formed on the reflection sheet. The behavior of illumination light will be given as follows. Illumination light emitted from the fluorescent lamp 25 is introduced into the light guide plate 2 through the incidence surface 2A directly or after having been reflected by the reflector 26. The introduced illumination light makes a propagation while undergoing repetitive reflection between the slope and the emitting surface. Every time reflection of the illumination light occurs on the slope, an angle of incidence with respect to the emitting surface is decreased. A component of light incident onto the emitting surface at an angle of not more than a critical angle is emitted through the emitting surface.

After the illumination light emitted through the emitting surface has been transmitted through the diffusible sheet 5, the directivity of illumination light is corrected by the prism sheets 6, 7 and the projection sheet 8. A liquid crystal display panel or the like is disposed on the outside of the protection sheet 8 and is illuminated from the rear.

It must be noted that part of the illumination light emitted from the fluorescent lamp 25 is incident onto upper and lower edges EU, ED of the incidence surface 2A directly or after having been reflected by the reflector 26.

If the edges EU, ED are brightly illuminated with part of the illumination light described above, these illuminated edges may be observed as emission lines from above the emitting surface. However, in the embodiment of the present invention, it is possible to avoid this phenomenon. Even if the illumination light makes a propagation toward the lower edge ED, there is less quantity in illumination light actually incident onto the edge ED, since the reflection sheet 4 projects toward the primary light source, and is pressed against the light guide plate 2 by the reflector 26. More specifically, it is considered that the reflection sheet 4 in a portion of the edge ED is finely deformed in accordance with a shape of the edge ED by the action of press force from the reflector 26, and controls a quantity of light incident onto the edge ED.

The illumination light incident onto the upper edge EU is controlled as follows. The reflector 26 is formed such that the reflector is allowed to project by a small distance to be parallel to the emitting surface of the light guide plate 2, after having been bent toward the incidence surface 2A to once reduce the total width. Accordingly, a component of light directing toward the edge EU from an upper part in the drawing on the basis of an imaginary plane extending from the emitting surface is completely shielded. On the other hand, in a component of light directing toward the edge EU from a lower part in the drawing on the basis of the above imaginary plane, since the end portion of the reflector 26 projects parallel to the emitting surface of the light guide plate 2, a quantity of light illuminating the edge EU is decreased due to the presence of the end portion of the reflector 26 more remarkably than that in the prior art.

The edges EU, ED are prevented from being brightly illuminated with the illumination light as described above. As a result, it is possible to effectively avoid the occurrence of emission lines, and to generate illumination light of high grade, in which the irregularities in luminance are restrained.

(Second Embodiment)

Figure 3:
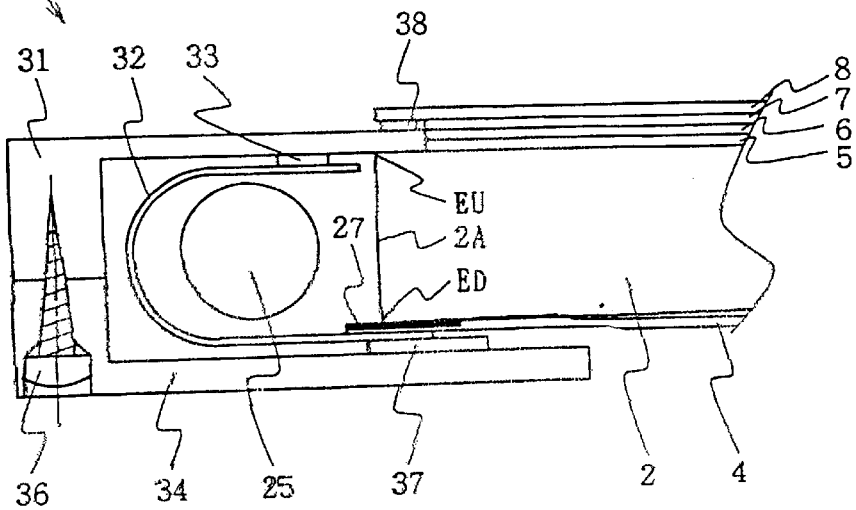
FIG. 3 is a sectional view showing a surface light source device of side light type according to the second embodiment of the present invention.

FIG. 3 shows a surface light source device of side light type according to the second embodiment of the present invention in the form of a drawing similar to that shown in FIG. 1. Referring to FIG. 3, a surface light source device of side light type 30 comprises a frame 31 which supports components including a light guide plate 2 and a primary light source from the side of an emitting surface of the light guide plate 2.

The frame 31 is made of a white resin by means of injection molding and takes a shape resembling a picture frame. In the vicinity of an upper edge EU of the light guide plate 2, an adhesive double-side coated tape 33 is applied to the frame 31 to be in approximately parallel to the upper edge EU. The frame 31 supports a corner portion of a reflector 32 through this adhesive double-side coated tape 33.

The reflector 32 is made of a sheet-like regular reflective member, and is supported with the adhesive double-side coated tape 33 such that an end surface of the reflector is nearly abutted against an incidence surface 2A on the side of the upper edge EU. Thus, the reflector 32 shields illumination light, which reaches the edge EU, with the end of the reflector disposed in close proximity to the upper edge EU, and prevents the edge EU from being brightly illuminated.

After the frame 31 has supported the reflector 32 with the adhesive double-side coated tape 33 in this manner, the light guide plate 2 and the reflector sheet 4 are laminatedly arranged. Then, the reflector 32 is bent so as to surround a fluorescent lamp 25, and subsequently, a support member 34 is fixed to the frame 31 from the slope side.

The reflection sheet 4 is formed such that an end of the reflection sheet projects from the incidence surface 2A of the light guide plate 2, similarly to that in the first embodiment. Further, a light absorbable layer 27 is formed on the reflection sheet 4 on the side of the primary light source.

The support member 34 is made of a metal member such as stainless steel and aluminum, and is fixed to the frame 31 with a screw 36 which is passed through a tapped hole formed in the frame 31. This support member 34 presses the end of the reflector 32 on the side of the slope and the end of the reflection sheet 4 on the side of the incidence surface through cushioning materials 37 disposed on the slope side, the front end and the inside of the support member.

The cushioning material 37 is made of an elastic member including silicone rubber. After the support member 34 has been mounted in this manner, a diffusible sheet 5, prism sheets 6, 7 are laminatedly arranged on the emitting surface of the light guide plate 2, and a protection sheet 8 is further arranged on the prism sheet.

Thereafter, the protection sheet 8 is fixed to the frame 31 with an adhesive double-side coated tape 38. Even if the structure shown in FIG. 3 is modified such that the end of the reflection sheet 4 is allowed to project from the incidence surface 2A toward the primary light source, and the reflection sheet 4 is pressed by the cushioning materials 37, it is also possible to decrease a quantity of light incident onto a lower edge ED. Thus, it is possible to produce the results similar to those in the first embodiment.

(Third Embodiment)

Figure 4:
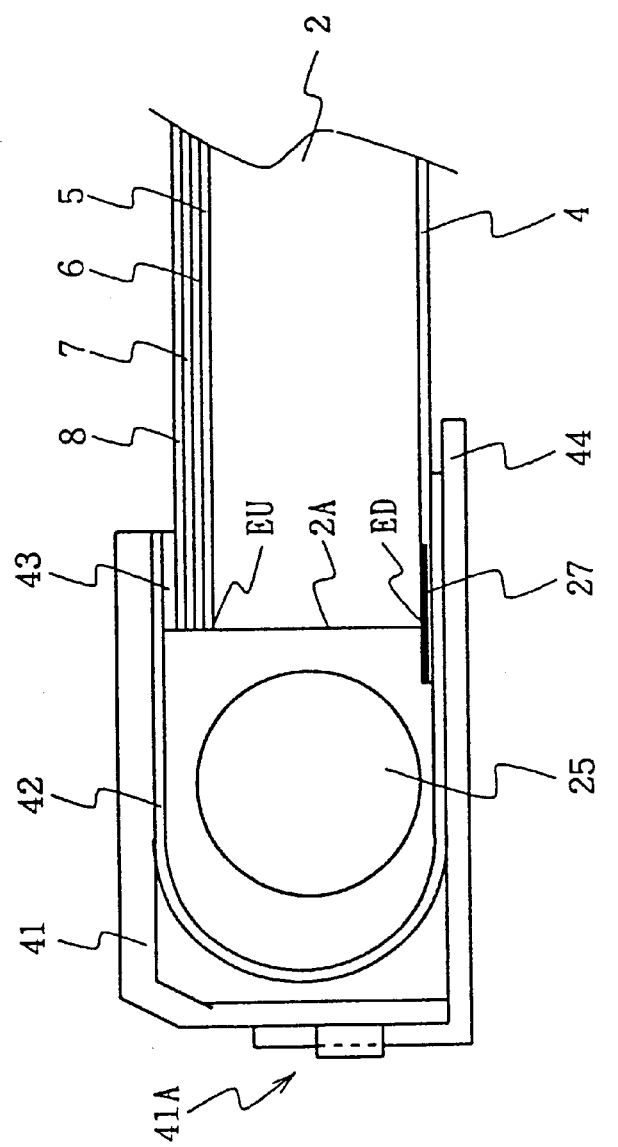
FIG. 4 is a sectional view showing a surface light source device of side light type according to the third embodiment of the present invention.

FIG. 4 shows a surface light source device of side light type according to the third embodiment of the present invention in the form of a drawing similar to that shown in FIG. 3. The components common to FIGS. 3 and 4 are designated by the corresponding reference numerals, and descriptions thereof are omitted to avoid repetition. Referring to FIG. 4, a surface light source device of side light type 40 comprises a frame 41, which supports components such as a diffusible sheet 5, prism sheets 6, 7 and a protection sheet 8 together with a light guide plate 2 as one body.

The frame 41 is made of a white resin by means of injection molding and takes a shape resembling a picture frame, and an adhesive double-side coated tape is applied to an end portion of the frame on the side of an emitting surface of the light guide plate 2 to be in approximately parallel to an upper edge EU. A corner portion of a reflector 42 is supported by the frame 41 through the adhesive double-side coated tape. The reflector 42 is made of a sheet-like regular reflective member.

Further, the frame 41 has projection 41A at a certain interval on the circumference of a side surface parallel to an incidence surface. The base of the projection 41A has a slit-like through hole, which provides a margin for insertion to fix a support member 44 through this through hole.

The frame 41 has also the similar margin for insertion in a side surface corresponding to both ends of the primary light source. After the frame 41 has supported the reflector 42 with the adhesive double-side coated tape, a cushioning material 43 including silicone rubber is mounted on an end portion of the frame on the side of the emitting surface of the light guide plate 2 with the adhesive double-side coated tape. Subsequently, the reflection sheet 4, the light guide plate 2, the diffusible sheet 5, the prism sheets 6, 7 and the protection sheet 8 are laminatedly arranged in sequence.

Thereafter, the reflector 42 is bent so as to surround a fluorescent lamp 25, and the support member 44 is fixed to the frame from the slope side. The end surfaces of the protection sheet 8, the prism sheets 7, 6 and the diffusible sheet 6 on the side of the primary light source are treated to shield the light. Thus, it is possible to avoid the irregularities in luminance caused by illumination light incident through these end surfaces.

On the other hand, the light guide plate 2 is treated to shield the light from the upper edge EU by means of coating of ink, and as a result, it is possible to prevent the upper edge EU from being brightly illuminated. The reflection sheet 4 is formed such that an end of the reflection sheet projects from the incidence surface 2A of the light guide plate 2, and a light absorbable layer 27 is formed on the reflection sheet 4 on the side of the primary light source, similarly to that in the first embodiment.

The support member 44 is made of a metal sheet material such as stainless steel and aluminum by means of bending. The support member 44 is fixed to the frame 41 by bending the end of a flange-like projection which is inserted into the margin for insertion formed in the frame 41. The support member 44 fixed to the frame covers the primary light source and part of the light guide plate 2 on the side of the incidence surface, and presses the reflection sheet 4 against the light guide plate 2 through the reflector 42.

Even if the structure shown in FIG. 4 is modified such that the cushioning material 43 is disposed on the side of the emitting surface, and is adapted to press the reflection sheet 4 against the light guide plate 2 in cooperation with the prism sheets or the like, it is possible to produce the results similar to those in the second embodiment.

(Other Embodiments)

The present invention may include the following modifications.

(a) In the above embodiments, the reflection sheet is pressed against the light guide plate 2 through the cushioning material or the like. However, the present invention is not limited to the above embodiments. It is also possible to use other press member for pressing the reflection sheet against the light guide plate 2. Further, various components including the light guide plate may be housed in the frame without using any press member, unless an injurious space is formed such as to cause the irregularities in luminance between the reflection sheet and the light guide plate.

(b) In the above embodiments, the reflection sheet made of the white PET is employed. However, the present invention is not limited to the above embodiments. It is also possible to use, for instance, a regular reflective member such as a film, on which silver is evaporated, for the reflection sheet.

(C) In the above embodiments, the frame made of the white resin is employed. However, the present invention is not limited to the above embodiments. It is also possible to use metal or the like, in addition to the resin, for a material of the frame.

(d) In the above embodiments, the diffusible surface is provided on the surface (the slope) opposite to the emitting surface of the light guide plate. However, the present invention is not limited to the above embodiments. It is also possible to provide the diffusible surface on the emitting surface, instead of the surface opposite to the emitting surface. Further, it is also possible to provide the diffusible surface on both surfaces (the emitting surface and its opposite surface).

(e) In the above embodiments, the light guide plate has the wedge-shaped section. However, the present invention is not limited to the above embodiments. It is also possible to use a plate-like light guide plate having a diffusible film or diffusible surface or the like formed on one or both surfaces, instead of the wedge-shaped light guide plate.

(f) In the above embodiments, two pieces of prism sheets, each of which has one surface serving as a prism surface, are disposed as a light control member. However, the present invention is not limited to the above embodiments. It is also possible to use only a piece of prism sheet. Otherwise, it is also possible to use a so-called double faced prism sheet having both surfaces serving as prism surfaces. The present invention may be also applied to an arrangement using no prism sheet.

(g) In the above embodiments, the diffusible sheet, the prism sheets and the protection sheet of low diffusibility are laminatedly arranged in sequence on the emitting surface of the light guide plate. However, the present invention is not limited to the above embodiments. It is also possible to alter the arrangement of these sheet members at need.

(h) In the above embodiments, the illumination light is supplied through one end surface (the incidence surface) of the light guide plate. However, the present invention is not limited to the above embodiments. It is also possible to supply the illumination light to a plurality of end surfaces (incidence surfaces).

(i) In the above embodiments, the long cylindrical light source is employed as the primary light source. However, the present invention is not limited to the above embodiments. It is also possible to use, for instance, one or more point light sources such as light-emitting diodes for the primary light source.

(j) In the above embodiments, descriptions have been given of the application of the present invention to backlighting in the liquid crystal display. However, the present invention is not limited to the above embodiments. It is also possible to generally apply the present invention to various surface light source devices of side light type such as illumination equipments and displays or the like.

As has been described in detail, according to the surface light source device of side light type in the present invention, since the reflection sheet is supported by allowing the reflection sheet to project toward the primary light source, it is possible to prevent a phenomenon that the edges on the side of the reflection sheet are brightly illuminated with the illumination light from occurring in the vicinity of the incidence surface of the light guide plate (i.e., the end surface to which the light is supplied). As a result, it is possible to effectively avoid the irregularities in luminance which is liable to occur when the brightness in the edges is observed from above the emitting surface. That is, the surface light source device of side light type according to the present invention may provide illumination light of high grade.

What is claimed is:

1. A surface light source device of side light type including a light guide plate having an incidence surface, an emitting surface and a surface opposite to the emitting surface, and a primary light source to supply light to said incidence surface, comprising:

a reflection sheet arranged along said surface opposite to said emitting surface of said light guide plate so that said reflection sheet projections from an edge of said incidence surface within around the edge toward said primary light source without hanging over said incidence surface.

2. A surface light source device of side light type according to claim 1, wherein said reflection sheet is pressed against said light guide plate in the vicinity of said incidence surface.

3. A surface light source device of side light type according to claim 1 or 2, wherein a light absorbable layer is formed on an end portion of said reflection sheet on the side of said primary light source.

* * * * *